(12) United States Patent
Mazzone

(10) Patent No.: US 11,760,392 B2
(45) Date of Patent: Sep. 19, 2023

(54) OPERATION OF RAIL VEHICLES TO LIMIT POWER PEAKS IN AN ELECTRICAL SUPPLY

(71) Applicant: Bombardier Transportation GmbH, Berlin (DE)

(72) Inventor: Andrea Mazzone, Zurich (CH)

(73) Assignee: Bombardier Transportation GmbH, Berlin (DE)

( * ) Notice: Subject to any disclaimer, the term of this patent is extended or adjusted under 35 U.S.C. 154(b) by 394 days.

(21) Appl. No.: 17/089,782

(22) Filed: Nov. 5, 2020

(65) Prior Publication Data

US 2021/0129874 A1    May 6, 2021

(30) Foreign Application Priority Data

Nov. 6, 2019  (DE) ................... 10 2019 217 148.6

(51) Int. Cl.
*B61C 17/06*   (2006.01)
*B60L 50/53*   (2019.01)
(Continued)

(52) U.S. Cl.
CPC ............ *B61C 17/06* (2013.01); *B60L 3/0023* (2013.01); *B60L 50/53* (2019.02); *B60L 53/56* (2019.02);
(Continued)

(58) Field of Classification Search
CPC . B61C 3/02; B61C 17/06; B60L 50/53; B60L 53/56; B60L 3/0023; B60L 2200/26; B60M 7/003
See application file for complete search history.

(56) References Cited

U.S. PATENT DOCUMENTS

| | | |
|---|---|---|
| 7,397,149 B2 | 7/2008 | Seddiki et al. |
| 2003/0197493 A1 | 10/2003 | Debard et al. |
| 2016/0304000 A1* | 10/2016 | Barlini ..................... B60M 1/18 |

FOREIGN PATENT DOCUMENTS

| | | |
|---|---|---|
| DE | 19654960 A1 | 7/1998 |
| DE | 102008037661 A1 | 2/2010 |

(Continued)

OTHER PUBLICATIONS

Al-Ezee et al., "Aspects of catenary free operation of DC traction systems," 2015 50th International Universities Power Engineering Conference (UPEC), 2015, pp. 1-5, doi: 10.1109/UPEC.2015.7339959.

(Continued)

*Primary Examiner* — Robert J McGarry, Jr.
(74) *Attorney, Agent, or Firm* — The Webb Law Firm

(57) ABSTRACT

A rail vehicle is configured for extracting electrical energy from a power supply external to the vehicle and has at least one electrical energy storage unit. In a first operating mode, the rail vehicle travels by means of energy extracted from the power supply and without energy from the energy storage unit. In a second operating mode, the rail vehicle travels, at least in part, by means of energy from the energy storage unit and/or at reduced traction power in comparison to the first operating mode. The rail vehicle includes a controller set up for activating the first or the second operating mode, as a function of an upper consumption limit, which defines the permissible upper limit of the power that can be extracted from the power supply. The upper consumption limit is established in a variable manner so as to prevent power peaks in the power supply.

11 Claims, 3 Drawing Sheets

(51) Int. Cl.
 *B60L 53/56* (2019.01)
 *B60L 3/00* (2019.01)
 *B60M 7/00* (2006.01)
 *B61C 3/02* (2006.01)
(52) U.S. Cl.
 CPC .............. *B60M 7/003* (2013.01); *B61C 3/02* (2013.01); *B60L 2200/26* (2013.01)

(56) References Cited

FOREIGN PATENT DOCUMENTS

| | | | |
|---|---|---|---|
| DE | 102011106440 A1 * | 1/2013 | .......... B61L 27/0027 |
| DE | 102011106440 A1 | 1/2013 | |
| DE | 102013218030 A1 | 3/2015 | |
| DE | 102016224125 A1 | 6/2018 | |
| EP | 0997340 A1 | 5/2000 | |
| EP | 1354752 A1 | 10/2003 | |
| EP | 1359049 A1 | 11/2003 | |
| EP | 3170692 A1 | 5/2017 | |
| JP | H07304353 A | 11/1995 | |

OTHER PUBLICATIONS

Scholten et al., "Energiespeicher auf Gleichstrom-Schienenfahrzeugen// Energy Storage on Board of DC Railway Vehicles//Accumulation de L'Energie a Bord des Vehicules Ferroviaires Alimentes au C. C", EB—Elektrische Bahnen, DIV-Deutscher Industrieverlag, DE, Bd. 101, Nr. 12, Dec. 1, 2003 (Dec. 1, 2003), Seiten 533-538, XP001185167, ISSN: 0013-5437.

* cited by examiner

OPERATION OF RAIL VEHICLES TO LIMIT POWER PEAKS IN AN ELECTRICAL SUPPLY

CROSS-REFERENCE TO RELATED APPLICATION

This application claims priority to German Patent Application No. 10 2019 217 148.6 filed Nov. 6, 2019, the disclosure of which is hereby incorporated by reference in its entirety.

BACKGROUND OF THE INVENTION

Field of the Invention

The invention relates to a rail vehicle, a method for operation of a rail vehicle, an arrangement having a rail vehicle fleet, and a method for operation of a rail vehicle fleet. In this regard, all the rail vehicles are driven electrically, at least in part.

Description of the Related Art

Electrically driven rail vehicles, which are supplied with electrical energy from a power supply network external to the vehicle or, in other words, from a power supply external to the vehicle, are widespread. In this regard, the rail vehicles tap power from a power rail or from an overhead line of the power supply by means of a pantograph, for example.

Depending on the momentary power demand (in other words the momentary energy requirement), which can be predetermined automatically or manually, by means of a traction force demand, the rail vehicle obtains variable power from the power supply. If a plurality of consumers (for example a plurality of rail vehicles) taps electrical power from the power supply at the same time, this can lead to what are called power peaks. These can be understood to mean power levels within the power supply that lie above a defined threshold value. These power values can be made available by a substation of the power supply or can occur at such a station or be measured there.

The threshold value can correspond, for example, to a power or energy amount that is made available, for which the power supply and, in particular, a substation, if applicable, is designed during regular operation. In particular, the threshold value can correspond to a power value above which the energy costs, as they are established by an operator of the rail network or of the power supply, exceed a certain price limit.

A substation can be understood to be a transformer station that is set up, in a known manner, for supplying assigned overhead line sections and/or power rail sections with electrical energy from an overriding power network (for example from a public power network and/or a railway power network).

Power peaks of the type described above can be undesirable for various reasons. For example, an energy price (in particular a kilowatt-hour price) of the electrical energy used by the rail vehicles is often established as a function of the occurrence or non-occurrence of power peaks. When power peaks occur, clearly higher energy prices can become due than when power peaks are avoided. For rail traffic enterprises, it can be desirable to limit the energy costs for operation of their rail vehicles to the greatest extent possible.

From an infrastructure point of view, it can also be desirable to prevent power peaks as much as possible. Thus, it is known, for example, that the power supply network at railway stations and in route segments that carry heavy traffic and/or are characterized by great energy demand (for example in the case of great inclines) must be specially designed for possible power peaks that only occur rarely, if necessary. This is accompanied by an increase in complexity and costs.

For example, it can be necessary to provide special substations only for the case of power peaks, which occur rarely, and then also to activate them correspondingly rarely or selectively. The inventors have recognized that if power peaks are consistently prevented, this requirement can be eliminated or at least restricted.

Furthermore, operation of a power supply network during power peaks can be characterized by reduced efficiency (for example if additional loss-related substations have to be turned on).

SUMMARY OF THE INVENTION

It is therefore a task of the present invention to improve the operation of rail vehicles with regard to undesirable power peaks of a power supply.

This task is accomplished by a rail vehicle, by the arrangements, and by the methods described herein. Furthermore, it is understood that characteristics mentioned in the introductory description can be provided individually or in any desired combination, also in the case of the solution disclosed here, unless something else is indicated or evident.

According to the invention, it was recognized that the occurrence of power peaks should be restricted as much as possible in order to prevent the disadvantages mentioned above. For this purpose, it is proposed, in accordance with an optional invention aspect, to equip rail vehicles with an electrical energy storage unit. If a danger of the occurrence of undesirable power peaks exists, an energy supply of the rail vehicle can take place, at least temporarily, from this electrical energy storage unit. The power consumption of the rail vehicle from the power supply can then be limited accordingly, so that the supply is relieved of a burden and the risk of the occurrence of power peaks is reduced.

Alternatively or in addition, the electrical power consumption can be reduced by means of at least temporary reduction of the traction power of the rail vehicle.

Likewise, according to one aspect of the invention, it can be provided to coordinate the corresponding energy consumption and, above all, the power consumption by a rail vehicle from a power supply, for a rail vehicle fleet having multiple rail vehicles, for the purpose of preventing power peaks, for example by means of an overriding fleet controller (or, in other words, a fleet controller). Optionally, it can also be provided that at least one of the rail vehicles selectively taps energy from an internal energy storage unit, in order to prevent power peaks and in view of a cumulative fleet energy demand (i.e., it switches over to an energy supply from this energy storage unit instead of the external power supply, at least on a pro rata basis).

By preventing the power peaks, the energy costs can be lowered, efficiency can be improved, and demands on the infrastructure can also be reduced, at least in the medium-range term (for example by making a lower-energy design or also the elimination of additional substations primarily intended for power peaks possible).

In particular, a rail vehicle is set up, among other things, for receiving electrical energy from a power supply external to the vehicle (which has an overhead line or power rail, for example), and which has preferably at least one electrical energy storage unit, wherein the rail vehicle can be moved to travel by means of energy obtained from the power supply in a first operating mode (and, if present, without energy from the energy storage unit), and, in a second operating mode, can be moved to travel by means of energy from the energy storage unit, at least in part (or also for the most part or entirely), if such a unit is present, and/or at a power reduced in comparison with the first operating mode (in particular traction power), wherein the rail vehicle comprises a controller that is set up for activating the first or the second operating mode as a function of the upper power consumption limit, which [word missing: represents] a permissible upper limit of the energy consumption and, to state it more precisely, of the power consumption from the power supply.

In the second operating mode, electrical energy or power can continue to be derived from the power supply external to the vehicle (in particular, exclusively from it, without an energy storage unit being provided or used).

The upper consumption limit can be selected, in particular, to prevent power peaks within the power supply and/or for targeted throttling of the power taken from the power supply. It can define a limit for power that can be taken from the power supply.

The rail vehicle can be a locomotive, a power car or a combination of multiple individual vehicles, wherein preferably at least one of these individual vehicles comprises a traction system for travel movement of the rail vehicle.

Travel movement of a rail vehicle can be understood to mean that the rail vehicle converts electrical energy to traction energy, for example so as to travel in a specific direction at a desired speed. The conversion can take place by means of a drive system or also a traction system of the type described herein, for example in that the electrical energy is used to drive at least one traction motor of the rail vehicle.

The electrical energy storage unit can comprise at least a battery, at least a rechargeable battery and/or at least a (super) capacitor. The energy storage unit is referred to as electrical because it can at least store electrical energy (i.e., also other forms of energy that can be converted to electrical energy). However, it does not necessarily have to be an electrical device (for example with electrical storage components). For example, the energy storage unit can also store mechanical energy (for example in the case of a configuration as a flywheel), which can then be converted back into electrical energy for the purpose of providing it to consumers.

The amount of energy that can be stored in the energy storage unit can be dimensioned in such a manner that travel movement of the rail vehicle can be achieved with this energy, at least in part or entirely. This travel movement can take place over a distance of more than 1 km or even more than 10 km and/or at a predetermined minimum speed of at least 30 km/h, for example.

In general, it can be provided that electrical energy obtained from the power supply can be stored in the electrical energy storage unit and/or that energy that is obtained during regenerative braking operation, for example, can be stored in it. In the latter case, the traction motors can be operated in generator mode, in known manner, and the electrical energy obtained during this process can be stored in the energy storage unit.

In order to activate either the first or the second operating mode, the controller can control suitable switching devices or power converter arrangements in suitable manner. For example, in the first operating mode the electrical energy storage unit can be electrically separated from the at least one traction motor per switching device or per deactivated power converter or charging device. Instead, an electrical connection between a power consumer and, in particular, a main transformer of the rail vehicle and a power converter that supplies the at least one traction motor can be closed and/or this power converter can be activated for a corresponding power supply of the traction motor.

In the second operating mode, the power supply can be optionally interrupted between power consumer and traction motor(s), in the opposite manner. In each case, however, the electrical connection between the electrical energy storage unit and the traction motor(s) can be closed, so as to access energy from this energy storage unit, at least in part.

Alternatively or in addition, reduced traction power can be generated in comparison with the first operating mode, i.e. the available traction power is limited. Fundamentally, further electrical energy can then be obtained from the external power supply, but a burden on the latter is relieved due to operation of the rail vehicle at a reduced power. It can also be provided, in advantageous manner, that even at the reduced power in the second operating mode, the optional energy storage unit is accessed, at least in part. Then the power supply is particularly relieved of a burden, but on the other hand, the energy storage unit is not excessively burdened.

The upper consumption limit can be selected in such a manner that the risk of the occurrence of undesirable power peaks is reduced. In general, the upper consumption limit can be established in variable manner. Examples of possibilities for establishing it will be explained in greater detail below.

Measures for ensuring that energy consumption and, in particular, power consumption takes place without exceeding the upper consumption limit are provided but are not compulsory. Instead, only equalization between the energy consumption or an energy demand and the upper consumption limit can also take place. If the upper consumption limit is exceeded, it is then possible to switch over to the second operating mode.

If energy consumption and, in particular, power consumption in accordance with the upper consumption limit (i.e., without exceeding it) is supposed to be ensured, this can take place by means of suitable control of a power converter arrangement, which connects a main transformer of the rail vehicle with a direct-current intermediate circuit, in known manner. In addition or alternatively, a power converter arrangement that connects the direct-voltage intermediate circuit with at least one traction motor can be suitably controlled.

Controlling can take place, in the case of both of the cases mentioned above, in such a manner that power consumption from the power supply external to the vehicle is reduced, for example by means of at least partial deactivation or downcycling of the aforementioned power converter arrangements, in particular.

By setting an upper consumption limit, power consumption from the power supply external to the vehicle can therefore be throttled, at least in part, or even prevented entirely. In the latter case, the upper consumption limit must be selected to be correspondingly low.

In summary, it can be provided that complete energy consumption from the power supply is fundamentally prioritized as compared to energy extraction from the energy storage unit. In particular, however, in order to prevent power peaks, energy extraction from the energy storage unit can be turned on, at least selectively. Therefore if the energy demand of the rail vehicle and, in particular, its power demand leads to the result that the power supply might be overloaded or that power peaks can occur in it, this power supply can be relieved of a burden, at least in part, by means of energy extraction from the energy storage unit, which then functions as an alternative energy source, so to speak.

It is understood that energy extraction from the energy storage unit is equivalent to at least partial coverage of the power demand of the rail vehicle by means of or from the energy storage unit. Power consumption from the power supply by the rail vehicle can then be reduced accordingly in the case of extraction from the energy storage unit.

A further development provides that the controller is set up for activating the first or the second operating mode as a function of an energy demand variable (which can also be referred to as a power demand variable or indicates such a power demand) of the rail vehicle. The energy demand variable can also be referred to as a power demand of the rail vehicle. This can be a power or energy demand measured at a specific time (or, in other words, momentary energy consumption or power draw), an energy demand estimated or determined on the basis of a traction force or a demanded speed, for example, or an energy demand expected in the future, which can be determined on the basis of upcoming route profiles, for example.

According to one example, the power demand variable can be determined on the basis of a demanded travel movement of the rail vehicle. Consequently, the power demand variable can be composed, in particular, of a required traction energy and, in particular, of a traction power that is required to achieve a desired travel movement (for example a desired speed and/or traction force). These requirements can be manually predetermined by a vehicle driver or, alternately, by a train control system (for example a system according to the ATO over ETCS Standard, Automatic Train Operation secured by the European Train Control System).

In addition or alternatively, the power demand variable can be determined on the basis of a measured power draw and/or a measured energy demand. For example, at least in the first operating mode, it can be measured what electrical energy amount or power is currently being extracted from the power supply. This power can then be used for determining the power demand variable or can be equated with it, since it corresponds to the momentary power demand.

The controller can be set up for determining the power demand variable, for example according to one of the variants mentioned above (for example based on traction demand or measurement). As has been mentioned, this can be done, for example, as determined by a demand for a traction force or a speed and/or with knowledge of rail vehicle parameters (such as weight) and/or with knowledge of route parameters (such as a route incline). Alternatively, the power demand variable can also be determined by a different device and transmitted to the controller.

According to one variant, threshold values or rules can be established, which determine at what values of the energy demand variable the first or the second operating mode should be activated or a switch between these modes should take place.

In addition or alternatively, a further embodiment provides that the second operating mode can be activated, at the latest, when the power demand variable is greater than the upper consumption limit. If this condition has been met, a momentary or requested power demand of the rail vehicle, or one expected in the future, can no longer be covered by the power consumption from the power supply external to the vehicle, which is limited in order to prevent power peaks or, in other words, capped. Instead, then an additional energy supply or optionally also the complete energy supply is obtained from the energy storage unit. In this way, it is guaranteed that in spite of restricted energy consumption from an external source, it continues to remain possible to achieve a desired travel performance of the rail vehicle.

Alternatively or in addition, the second operating mode can be activated, at the latest, when the upper consumption limit reaches a predetermined threshold value and/or lies below it. In this case, the possibility of energy consumption from the power supply, for example, can be viewed as being restricted in such a manner that prophylactically, so to speak, energy consumption from the energy storage unit is made possible. This can be the case, for example, if the upper consumption limit restricts the power consumption to a very low value of less than 10% of the power that can be maximally consumed by the rail vehicle, for example.

Furthermore, in addition or alternatively, the possibility also exists of turning the second operating mode on when a charge level of the energy storage unit reaches or exceeds a predetermined threshold value. This can be relevant, for example, when it is supposed to be ensured that electrical energy that is generated in possible future regenerative braking operation can be stored as comprehensively as possible and must not be dissipated, for example. The possibility of generating electrical energy in regenerative braking operation is preferably provided if the power supply is capable of absorbing it or recovering it, for example so as to be able to absorb energy amounts that the energy storage unit might no longer be able to absorb.

According to a further development, the upper consumption limit can be established based on at least one of the following:

a target set by the driver;
a target set by a controller external to the vehicle;
a target set by a controller internal to the vehicle.

The target set by the driver can be input, for example, by means of activating a suitable input device in a driver's cab of the rail vehicle.

The controller external to the vehicle can be comprised in a train control system and/or can make such a system available. In known manner, as one of their primary functions, train control systems can transmit speed targets to a rail vehicle, for example, in order to ensure adherence to desired speed profiles. An example is train control systems according to the ECTS standard mentioned above.

The controller internal to the vehicle can be comprised, for example, in an ATO over ECTS system as described above.

Fundamentally, however, it is also conceivable to provide for a controller that is different from conventional train control systems and, in particular, provided separately from them, to set a target for the upper consumption limit. An example of such a separate controller is a fleet controller as will be explained below, which coordinates the operation of a plurality of rail vehicles, in particular with regard to their electrical power consumed from a common power supply.

According to a further aspect, the upper consumption limit is determined based on a measurement variable that relates to a property of the power supply external to the vehicle (or, to state it differently, describes and/or quantifies this property). In particular, the measurement variable can be a voltage variable of the power supply (for example the amplitude and/or frequency of the alternating voltage found there). Preferably, the second operating mode can then be activated if the voltage variable and/or the upper consumption limit determined on the basis of it is less than a permissible threshold value. If the threshold value is not reached, this is an example of an activation criterion that must be fulfilled by the voltage variable of the second operating mode.

Likewise, the measurement variable can be a phase shift variable of the power supply. For example, it can indicate a phase shift between the current and the voltage in the power supply and/or a relative displacement of these variables with reference to a nominal phase shift. The phase shift can be determined by the rail vehicle using the consumed power or energy. Preferably, if the phase shift variable is greater than and/or if the upper consumption limit established on its basis is less than a permissible threshold value, the second operating mode can then be activated. Exceeding or not reaching the threshold value is an example of an activation criterion that must be fulfilled by the phase shift variable to activate the second operating mode.

In general, it can be provided that the lower the measurement variable and preferably the measured voltage variable, the lower the upper consumption limit can also be selected. In contrast, in the case of the phase shift variable, the upper consumption limit can decrease with an increasing phase shift variable.

By taking into consideration a measurement variable, it is possible to conclude with greater accuracy whether the risk of the occurrence of undesirable power peaks actually exists. In particular, the measurement variable can provide information about an actual burden on the power supply. The preferably measured voltage variable can permit particularly reliable conclusions regarding such a burden.

For example, a drop in the voltage variable below the permissible threshold value can indicate that a burden, i.e. the power drawn from the power supply is already comparatively high. In particular, the permissible threshold value can be selected in such a manner that reaching it or dropping below it indicates that an undesirable power peak can occur with great likelihood or might already be present.

In total, the possibility is created, by means of the above aspects, of limiting the energy extraction and, above all, the power consumption from the power supply in accordance with the demand, and, if necessary, switching between the first and the second operating mode. In this manner, undesirable voltage peaks within the power supply can be prevented with increased reliability.

Alternatively or in addition, momentary power of the power supply can be determined, and the second operating mode can be activated preferably when the momentary power is greater than a permissible threshold value. In particular, the upper consumption limit can be determined as a function of the momentary power, wherein the momentary power can then be an example of a measurement variable of the type disclosed herein. The momentary power can be determined by the rail vehicle, using the extracted power or as the extracted power. It can also be determined by a substation or another component of the power supply and transmitted to a fleet controller and/or to the rail vehicle.

The invention also relates to a method for operation of a rail vehicle, wherein the rail vehicle is set up for extracting electrical energy from a power supply external to the vehicle and preferably has at least one electrical energy storage unit, wherein the method comprises:

activation of a first or a second operating mode as a function of an upper consumption limit, which defines a permissible upper limit of power consumption (or, more generally, of energy consumption (i.e., the extractable amount of energy and/or the extractable power)) from the power supply;

wherein the rail vehicle, in the first operating mode, is moved to travel by means of energy consumed from the power supply external to the vehicle, and, without energy from the energy storage unit, if it is present, and, in the second operating mode, is moved to travel, at least in part, by means of energy from the energy storage unit, if it is present.

The method can comprise any further development, any further characteristic, and any further step so as to make available or carry out all of the operating states, interactions, and functions described above or below. In particular, the method can be carried out using an arrangement according to any of the aspects described above or below. In general, all further developments and embodiments relating to the rail vehicle characteristics can also apply to the method characteristics having the same wording or can be provided in them.

For example, the method can also comprise the step of maintaining and, in particular, determining the upper consumption limit, for example according to one of the preceding variants. Furthermore, the method can comprise steps for electrically connecting or separating traction motors with/from further components of the rail vehicle (for example with/from a power converter and/or transformer), so as to switch between a first and a second operating mode in the manner described above.

The invention also relates to an arrangement, having:
at least two rail vehicles (i.e., a rail vehicle fleet), which are set up, in each instance, to extract electrical energy from a power supply external to the vehicle, for the purpose of travel movement (and, in particular, according to a vehicle-specific energy demand variable); and
a fleet controller, which is set up for establishing an upper consumption limit, which defines a permissible upper limit of the power consumption of at least one of the rail vehicles from the power supply, according to (vehicle-specific) power demand variables that are received from each of the rail vehicles.

At least one of the rail vehicles can be configured according to any one of the aspects explained above, but this is not compulsory. For example, both of the rail vehicles can also be configured without an electrical energy storage unit or, instead, at least cannot be operated in a second operating mode of the type described herein. In particular, however, the latter can also be provided in accordance with the following embodiment.

To state it more precisely, it can be provided, according to a further aspect, that at least one of the rail vehicles has the above arrangement or that the rail vehicle fleet described there is configured according to one of the rail vehicle aspects described herein, i.e., has an electrical energy storage unit and can be operated in the second operating mode as described.

In the following, further variants and embodiments of the arrangement comprising a rail vehicle fleet and a fleet controller will be explained. Unless indicated or evident otherwise, these can be provided in any desired manner, individually or in combination with one another.

The fleet controller can be a controller external to the vehicle. In other words, this controller can be provided on the route side and/or can be fixed in place. For example, it can be comprised by a train control system, provided separately from a train control system but in analogous manner, along a rail route, or alternatively, made available in a control center of a railway network. In particular, the fleet controller can be comprised by a server, for example a Cloud Server.

Communication with the fleet controller can take place wirelessly and by way of mobile communications, for example. The fleet controller itself can comprise at least one micro-controller and/or can be implemented as a computer device. The term "fleet" is intended to express that the controller can communicate with a plurality of rail vehicles, which can be viewed as belonging to a fleet, for example.

The controller can receive the corresponding power demand variable from the rail vehicles, for example continuously, so as to constantly take the momentary power demand of the individual rail vehicles but also of the entire fleet into consideration. For this purpose, the rail vehicles can comprise suitable (preferably wireless) communications devices, for example a mobile communications transmitter.

The fleet controller can preferably send individual upper consumption limits to the individual rail vehicles (to state it more precisely, an individual limit to each of the rail vehicles, in each instance). In addition or alternatively, it can be provided that the upper consumption limit is of a relative nature, for example in that it defines a pro rata reduction of momentary power consumption from the power supply (for example by a specific percentage amount). In this case, the same upper consumption limit can also be transmitted to each of the rail vehicles, which limit then defines a demand for throttling the momentary power consumption by a specific, uniform percentage amount, for example.

In general, the fleet controller can be set up for reducing the fleet-wide (i.e., cumulative) power demand with reference to the power supply external to the vehicle or, in other words, a fleet-wide power extraction from the power supply, by means of establishing the upper consumption limit.

In addition or alternatively, the fleet controller can take into consideration at least one measurement variable relating to the power supply. The measurement variable can be a voltage variable of the type explained above and/or in general, can indicate a burden on the power supply resulting from the power extraction, for example so as to determine nearness to possible undesirable power peaks. In accordance with this measurement variable, the fleet controller can suitably establish the upper consumption limit(s) and, in particular, can reduce it/them if a high load is recognized.

In order to maintain upper consumption limits, the rail vehicles can comprise (preferably wireless) communications devices, for example a mobile communications receiver. In the manner explained above, the upper consumption limit can define a permissible power extraction from the power supply external to the vehicle, by a corresponding rail vehicle (for example as a permissible power value).

The upper consumption limit can also assume the value of zero for each of the aspects described in this disclosure. This means that the rail vehicle can be driven either only by means of energy from an energy storage unit, if it is present, or alternatively is supposed to remain at a standstill until the upper consumption limit is increased. The latter is equivalent to making energy consumption from the power supply possible.

Such a possible standstill command by the fleet controller can be justified, for example, if avoidance of power peaks is prioritized as compared to precise adherence to a schedule.

Preferably, the fleet controller receives the momentary power demand variables of the vehicles in real time, for example so as to be able to estimate a momentary load on the power network and/or a possible nearness to undesirable power peaks, for example, in particularly precise manner. In addition or alternatively, the fleet controller can transmit upper consumption limits, at least to selected rail vehicles, in real time or at predetermined updating intervals.

In the case of each of the aspects described in this disclosure, the power demand variable can indicate a power demand that lies in the future (for example in addition to or alternatively to a real-time energy demand). This demand can be estimated, for example, using planned routes, wherein the routes can be characterized by planned speed profiles and/or known inclines, for example. In addition or alternatively, future energy demand can also be determined from schedule information. Determining future energy demands can be carried out or at least prompted by the fleet controller or, alternately, by another (computer-implemented) determination device that then transmits the results to the fleet controller.

Taking into consideration future power demands allows proactive control of the operation of the rail vehicle fleet by the fleet controller.

In summary, the following, in particular, can be provided as further aspects in connection with the arrangement having two rail vehicles and the fleet controller:

According to a second aspect, which can be dependent on the first general aspect of the arrangement having two rail vehicles and the fleet controller, the fleet controller is set up for communicating wirelessly with the rail vehicles, for example by way of mobile communications. In this connection, it can furthermore be provided that the rail vehicles comprise a wireless communications device, for example a mobile communications transmitter and/or receiver.

According to a third aspect, which can be dependent on any one of the above aspects, the fleet controller is set up for establishing the upper consumption limit for the rail vehicle (or the upper consumption limits for the rail vehicles) in such a manner that fleet-wide (or, to state it differently, an overall and/or cumulative) power demand or energy demand is reduced.

In particular, the reduction can take place in such a manner that a permissible upper limit, which can correspond, for example, to an undesirable power peak within the power supply, is not reached.

According to a fourth aspect, which can be dependent on any one of the preceding aspects, the fleet controller is set up for taking into consideration a measurement variable relating to the power supply. This can take place according to any one of the above examples.

According to a fifth aspect, which can be dependent on any one of the preceding aspects, the fleet controller is set up for obtaining the power demand variables of the vehicles in real time and/or for determining a cumulative power demand of the rail vehicle fleet from the power demand variables. The upper consumption limit(s) for the rail vehicle or for the rail vehicles can then be established in accordance with this cumulative power demand.

According to a sixth aspect, which can be dependent on any one of the preceding aspects, the fleet controller is set up for also taking into consideration future power demand variables, in addition or alternatively to real-time power demand variables, for example, or, to state it differently, power demand variables that indicate a power demand that lies in the future. Possibilities for determining such a future power demand were stated above.

The invention also relates to a method for operation of a rail vehicle fleet, wherein the rail vehicle fleet comprises a first and at least a further rail vehicle, which are each set up for extracting electrical energy from a power supply external to the vehicle, for the purpose of travel movement (and preferably in accordance with a vehicle-specific power demand variable), wherein the method comprises:
- (preferably wireless) transmission of a power demand variable of each of the rail vehicles to a fleet controller;
- establishing an upper consumption limit (for the power that can be obtained from the power supply (14)) for at least one of the rail vehicles, in accordance with the power demand variables obtained, for example by means of the fleet controller explained above.

The method can comprise any further step and any further characteristic so as to make available all the functions, operating states, and interactions of the arrangement having a fleet controller as described above. In particular, all the embodiments and further developments of characteristics of this arrangement can also apply to the above method characteristics having the same wording or can be provided in these. Also, the method can be implemented with an arrangement according to any variant of this arrangement.

BRIEF DESCRIPTION OF THE FIGURES

In the following, embodiments of the invention will be explained using the attached schematic figures. In this regard, characteristics that agree with one another in terms of their type and/or function can be provided with the same reference symbols throughout the figures.

DETAILED DESCRIPTION OF THE INVENTION

Figure 1:
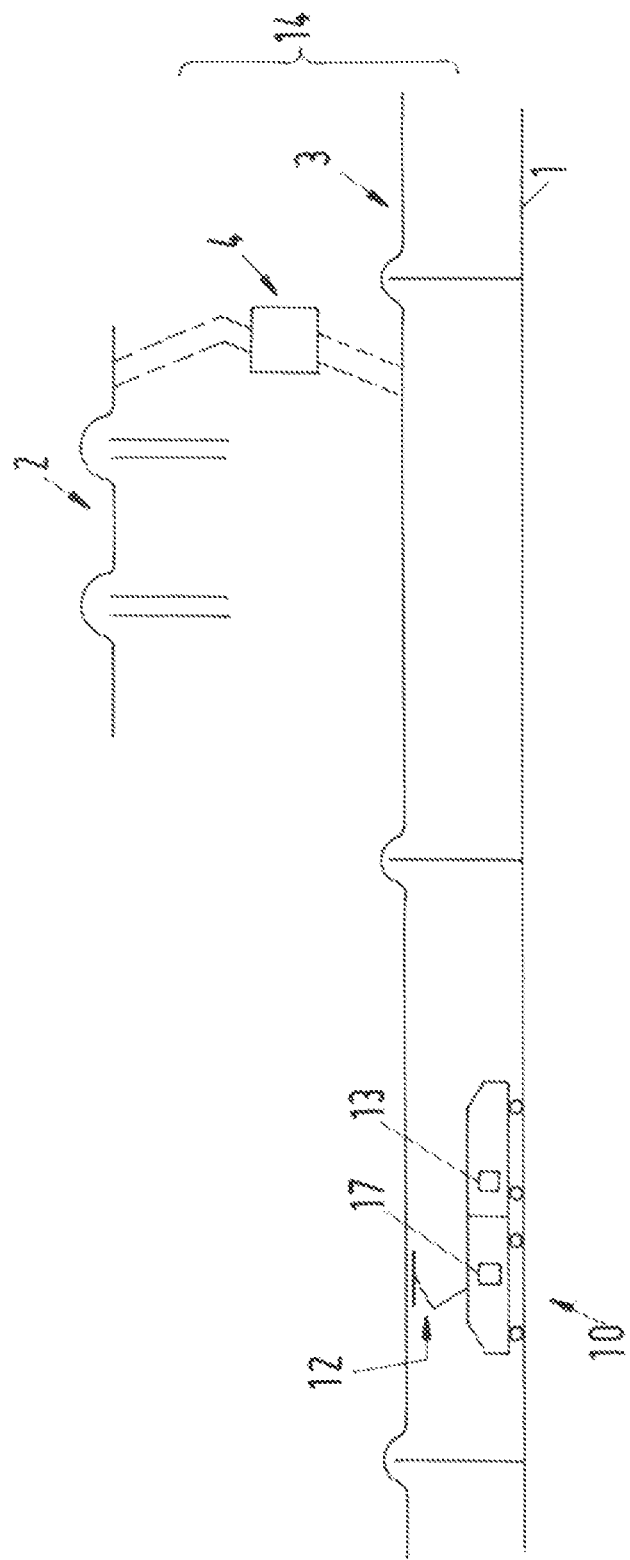
FIG. 1 shows a schematic view of a rail traffic route with a rail vehicle according to a first exemplary embodiment of the invention.

In FIG. 1, a segment of a rail traffic route 1 including electrical infrastructure is shown, within which a rail vehicle 10 according to a first exemplary embodiment of the invention is operated. The rail vehicle 10 is, as an example, a multi-part train having two power cars, between which other cars can also be optionally arranged.

As a usual component of the infrastructure, a public power network 2 can be seen, for example in the form of a railway power network. An overhead line 3, from which the rail vehicle 10 can extract electrical energy by means of a pantograph 12, is situated along the rail traffic route 1. Between the overhead line 3 and the public power network 2, there is a transformer station in the form of what is called a substation 4. Along the entire rail traffic route 1, of which only a segment is shown in FIG. 1, multiple such substations 4 can be provided, for example at least one substation 4 every 10 km or every 20 km.

Multiple substations 4 can also be provided for a single route segment, for example if this is a route segment having a high energy demand and/or power demand. This can be the case, for example, at train stations having a potential plurality of rail vehicles 10 entering the station at the same time or in the case of route segments having a great incline.

In the present case, the overhead line 3, preferably including the substation 4, forms a power supply 14 external to the vehicle. Fundamentally, however, the public power network 2 can also be comprised in the power supply external to the vehicle, according to the invention.

By means of the power supply 14, electrical power for travel movement of rail vehicles 10 is made available. In this regard, the power or amount of power made available is primarily a function of the power demanded or extracted by the rail vehicles 10. If the rail vehicle 10 or a plurality of rail vehicles 10, which are supplied by the power supply 14 at the same time, demand(s) a high (cumulative) power, undesirable power peaks can occur within the power supply 14. These can put a burden on the substation 4, in particular, i.e., can express themselves in an undesirable power increase of the substation 4 and can be measured there accordingly. In general, power made available by a substation 4 can be generated as a function of consumed or demanded power or, in other words, can lag behind this demanded power.

Figure 2:
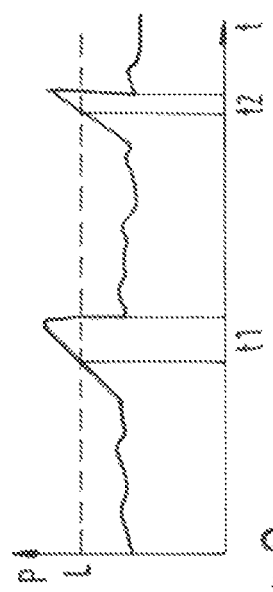
FIG. 2 shows a diagram for explaining undesirable power peaks in a power supply, as they can occur, for example, during operation of the rail vehicle from FIG. 1.

In FIG. 2, a corresponding power curve is shown as an example. To state it more precisely, the power of a substation 4 provided there, which is determined by the power P demanded by the rail vehicle(s) 10, is plotted above the time t. In this regard, a broken line indicates a permissible power peak limit L, which is not supposed to be exceeded. It can be seen that the power peak limit L is temporarily exceeded during the time periods t1 and t2. In this regard, the time periods t1, t2 can comprise only a few minutes or only a few seconds, for example less than 30 seconds.

The power curve from FIG. 2 can also indicate the power extracted by a rail vehicle 10 or a fleet of rail vehicles 10. The area under the power curve corresponds to the energy extracted from the power supply 14. When the rail vehicle 10 (or the fleet) starts up from a stop or on an incline, for example, the power peak limit L can be exceeded, even if the power supply 14 is fundamentally designed to cover the energy demand of the rail vehicle 10 (or the fleet).

As explained initially, the occurrence of such power peaks is connected with multiple disadvantages and can, in particular, result in increased energy costs for an operator of the rail vehicle 10 or a fleet of rail vehicles 10.

According to the invention, the rail vehicle 10 therefore comprises an electrical energy storage unit 13. This unit can be supplied with electrical energy, for example, from the overhead line 3, for example when the rail vehicle 10 is standing or if not all of the energy being taken from the overhead line is needed for travel movement. Charging with electrical energy obtained within the scope of regenerative brake operation is also possible.

The rail vehicle 10 also comprises a controller 17, for example a control device having at least a micro-controller, which processes algorithms and/or program instructions, so as to make desired functions available.

In the present case, the controller 17 is set up for switching between a first and a second operating mode of the rail vehicle 10 and, in particular, of its drive system 100. It is also possible to provide a control device external to the vehicle, in addition or alternatively, which can be, in particular, a component of a train control system. This device can take on all of the functions of the vehicle controller 17 as described herein or, alternatively, can control this controller 17 for carrying out the functions described herein. This optional controller external to the vehicle can be a controller independent of the fleet controller 50 explained below, since it is not necessarily set up for controlling a plurality of rail vehicles 10 in a large-area territory, for example.

In the following, making reference to FIG. 3, a possible embodiment of such a drive system 100 will be explained as an example. The components of this drive system 100 can fundamentally be distributed over any desired individual vehicles or power cars of the rail vehicle 10, but can optionally also be combined in one of the power cars. As shown with a broken line, numerous ones of the components of the drive system 100 can be connected with the controller 17, so as to transmit signals to it and/or receive control signals from it.

The drive system 100 is electrically connected with the pantograph 12, which is also shown. Proceeding from the pantograph 12, the consumed electrical energy is passed to a conventional main transformer 142 by way of a conventional high-voltage transformer 140 and a conventional main switch 138. The main switch 138 is set up, in known manner, for cutting the electrical connection between the pantograph 12 and the main transformer 142 by means of selectively opening the switch. The high-voltage transformer 140 can measure an applied voltage and/or a current flow (and thereby also consumed power), which is applied to the main transformer 142 on the primary side.

In this regard, in the present case the high-voltage transformer 140 also serves as an energy consumption measurement device, which measures the energy and/or power extracted by the rail vehicle 10 from the power supply 14.

The internal structure of the main transformer 142 is also shown in greatly simplified manner. A magnetic core 148 and a primary coil 144 are shown, to which a primary voltage is applied. Furthermore, secondary coils 146 are shown, to which a (transformed) secondary voltage is applied. In the assignment of the terms primary and secondary, the point of departure is a main operating state of the main transformer 142, in which electrical energy extracted by way of the pantograph 12 is made available on the primary side and converted to a secondary voltage for further use within the rail vehicle 10.

Furthermore, a power converter is connected with each of the secondary coils 146, wherein merely as an example, a first power converter 150 and a further power converter 152 are provided. The two power converters 150, 152, which can also be referred to as line current converters, can preferably be operated optionally as rectifiers or as inverters, and are connected with a direct-voltage intermediate circuit 151. Traction motors 156 are also connected with this direct-voltage intermediate circuit 151, which motors can preferably be operated optionally as motors or as generators.

A motor converter 154 is switched between the direct-voltage intermediate circuit 151 and the traction motors 156, in each instance, which converter again can preferably be operated optionally as a rectifier (for generator operation) or as an inverter (for motor operation).

The electrical energy storage unit 13 is also connected with the direct-voltage intermediate circuit 151; in the case shown, this unit is a battery. A charging device of the energy storage unit 13 is not shown separately; using this device it is possible to control energy consumption or energy output of this energy storage unit 13. The operation of the charging device can be controlled by the controller 17, as is indicated by a corresponding signal connection.

For travel movement along the rail traffic route 1, the rail vehicle 10 is set up, in a first operating mode, for decisively and preferably exclusively extracting electrical energy from the overhead line 3, and not falling back on electrical energy from the energy storage unit 13. In this case, the line current converters 150, 152 are operated as rectifiers and the motor converter 154 is operated as an inverter, with control and/or activation by means of the controller 17. In contrast, the main transformer 142 is typically a passive component that is not controlled separately.

In a second operating mode, in contrast, no exclusive energy consumption from the overhead line 3 takes place. Instead, the rail vehicle 10 is then operated, at least in part or also completely, on the basis of electrical energy from the energy storage unit 13. In addition or alternatively, the traction power that can be generated (and thereby the energy demand and, in particular, the power demand) of the rail vehicle 10 can be throttled.

If the electrical energy storage unit 13 is merely supposed to be added in the second operating mode, and if energy is to be continuously extracted from the overhead line 3, the controller 17 can turn on the energy storage unit 13 or its charging device for energy output at the desired level. If instead travel movement is supposed to take place exclusively by means of energy from the energy storage unit 13, the controller 17 can analogously turn on the energy storage unit or its charging device, but at the same time also deactivate the line current converters 150, 152 or, in other words, block them. In this state, no energy from the overhead line 3 can be fed into the direct-voltage intermediate circuit 151 any longer. In order to decide whether the first or the second operating mode is supposed to be activated, the controller 17 monitors whether momentary, demanded, or future energy consumption and preferably power consumption exceeds an upper consumption limit, which defines the permissible upper limit of the power consumption from the power supply 14. In the present case, the controller 17 is set up for also defining or establishing this upper consumption limit by itself. Fundamentally, all of the variants explained above are possible variants for such a determination. In particular, a corresponding target can be set by a driver or by a controller external to the vehicle.

In the case shown, it is additionally or alternatively provided to measure the voltage of the overhead line 3 that is applied to the pantograph 12 with regard to amplitude, so as to establish the upper consumption limit. This takes place by means of the high-voltage transformer 140, the measurement signals of which are transmitted to the controller 17 by way of the connection indicated with a broken line.

If the amplitude of the voltage in the overhead line 3 drops below a predetermined threshold value, this indicates a great load on the power supply 14, for example because a plurality of other rail vehicles 10 is already also being supplied with energy from it. In this case, the controller 17, in order to avoid undesirable power peaks, can set the upper consumption limit (of its own rail vehicle 10) to a value that lies below the maximum possible power consumption by the rail vehicle, i.e., a value that no longer allows unlimited power consumption from the power supply. For example, the upper consumption limit can be set to a value of less than 100%, i.e., the power consumption is then restricted to a certain percentage.

Subsequently, the controller 17 monitors whether the upper limit is exceeded by the power being demanded, for example, and, to state it more precisely, by a power demand variable determined on this basis. If this is the case, a switch to the second operating mode takes place. It is also possible to continue to check whether criteria for switching back to the first operating mode are present. These can be met, for example, if the upper limit is no longer reached, if the charge level of the energy storage unit 13 drops in an unacceptable manner and/or if the controller 17 issues a corresponding command to switch back.

If, in contrast, the voltage measured in the overhead line 3 does not reach the predetermined threshold value, the upper consumption limit can be set to a value that equates the upper limit with the maximum possible power consumption, i.e., does not restrict the maximum possible power consumption. For example, the upper consumption limit can be set to 100% or also be eliminated entirely, so that no restriction is present, in each instance.

Figure 4:
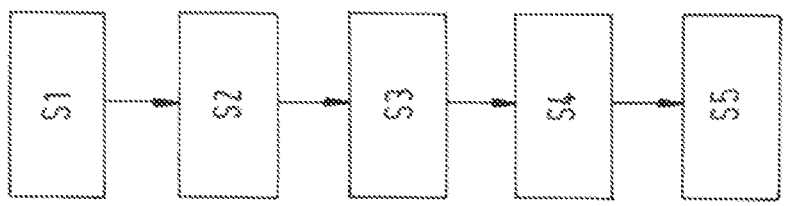
FIG. 4 shows a flow chart of a method according to a first exemplary embodiment, as it can be carried out using the rail vehicle from FIG. 1.

FIG. 4 presents a flow chart of the procedure fundamentally explained above, or of a method according to an exemplary embodiment of the invention is shown, by means of which the rail vehicle 10 can be operated.

In a step S1, the rail vehicle 10 is moved along the rail traffic route 1. The first operating mode is activated, i.e., the power consumption from the power supply 14 is not restricted, for example because the upper consumption limit takes on a value of 100%. Furthermore, the voltage of the overhead line 3 is measured and transmitted to the controller 17.

The power consumed by the rail vehicle 10 is determined as a power demand variable, using the measurement signals detected by the high-voltage transformer 140, and continuously monitored. Alternatively or in addition (for example to form an average), the power demand variable can also be estimated or calculated using a traction force demand that is present.

In steps S2 and S3, a permissible upper consumption limit is determined so as to prevent power peaks. To state it more precisely, in a step S2, which can be carried out in parallel with the step S1 and/or fundamentally continuously, the measured voltage of the overhead line 3 is compared to a predetermined threshold value. If this threshold value is exceeded, an undesirable burdened state of the power supply 14 is recognized, at which power peaks can occur. A switch to step S3 then takes place. If this threshold value is not exceeded, such a switch to step S3 does not take place, but rather further monitoring of the overhead line voltage takes place, for example.

In step S3, the upper consumption limit is changed since the threshold value was exceeded in step S2. To state it more precisely, this limit is set to a value different from 100% and, stated more precisely, reduced to a lower value, so that the power consumption from the overhead line 3 is restricted. Alternative or additional possibilities for establishing the upper consumption limit, as compared to steps S2 and S3, were explained above.

In a step S4, which can be carried out in parallel at least to step S3 and/or fundamentally continuously, the power demand variable (for example the demanded power) of the rail vehicle 10 is compared to the upper consumption limit. If the power demand variable lies above the upper consumption limit, a switch to a step S5 takes place and the second operating mode is activated. If this is not the case, such a switch to step S5 does not take place, but rather continued comparison of power demand and upper consumption limit takes place.

Figure 3:
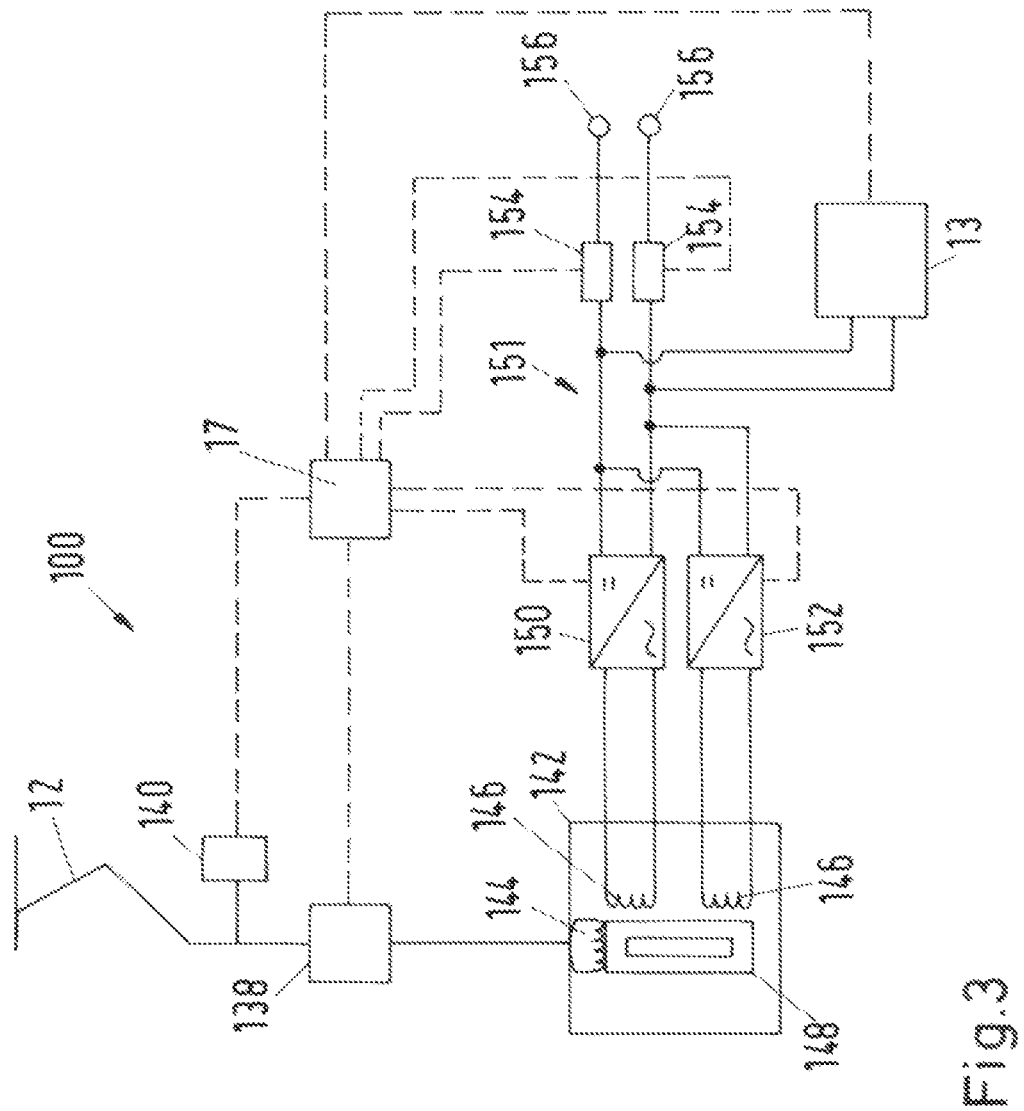
FIG. 3 shows a schematic representation of a drive system of the rail vehicle from FIG. 1.

In step S5, the drive system 100 from FIG. 3 is then operated in such a manner, in the way described above, that energy demand for travel movement is covered at least in part by the energy storage unit 13.

Figure 5:
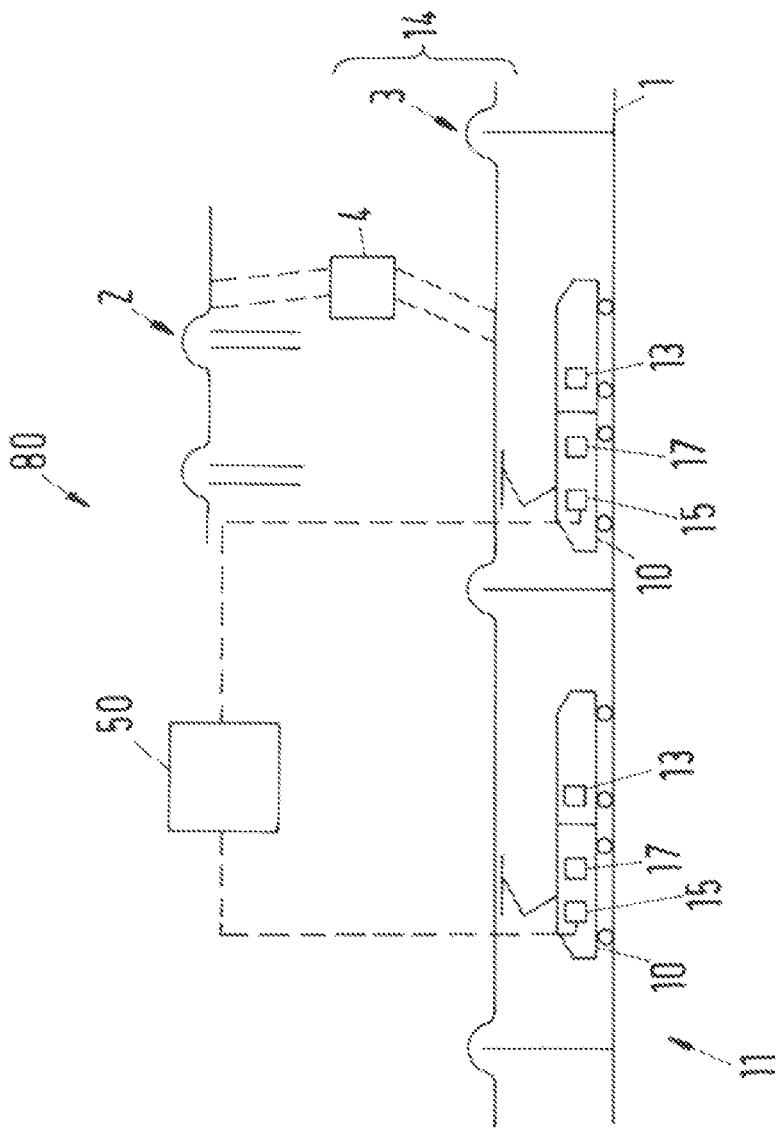
FIG. 5 shows a schematic view of an arrangement according to a further exemplary embodiment of the invention, in which a rail vehicle fleet is provided.

In FIG. 5 an arrangement 80 according to a second exemplary embodiment is shown. The representation essentially corresponds to that of FIG. 1, and therefore reference is also made to the above explanations regarding FIG. 1 and, in particular, to the characteristics having the same reference symbols, which also apply to FIG. 5.

However, the arrangement 80 does differ from that of FIG. 1, in that a rail vehicle fleet 11 having merely two rail vehicles 10, used as examples, is provided. Likewise, in contrast to FIG. 1, a fleet controller 50 is provided. The fleet controller 50, which is implemented as a Cloud Server, for example, or can be stored on such a server in the form of a computer program, communicates with communications devices 15 of the rail vehicle 10 in wireless manner and preferably by means of mobile communications. In this way, the fleet controller 50 is also indirectly connected with the controllers 17 of the rail vehicles 10. For example, signals sent by the fleet controller 50 to the corresponding communications devices 15 can be passed on to a corresponding controller 17, for example so that these controllers control a related rail vehicle 10 in a manner predetermined by the fleet controller 50.

The rail vehicles 10 are configured analogous to the one from FIG. 1 or FIG. 3, with the exception of the additional communications device 15. Fundamentally, however, it can be provided in the case of this embodiment, as well, that the rail vehicles 10 do not comprise an electrical energy storage unit 13, but otherwise are configured analogous to the variants of FIG. 1 and FIG. 3. Analogous to the variants explained in connection with FIG. 3 as well as in general above, a power demand variable can be determined for each of the rail vehicles 10. In the present case, this variable is transmitted by each of the rail vehicles 10, preferably in real time, to the fleet controller 50. From this, the latter determines a cumulative energy demand or power demand of the entire rail vehicle fleet 11, which must be covered by the power supply 14.

If the power demand exceeds a predetermined threshold value (for example a permissible (fleet) upper consumption limit), the power consumption from the overhead line 13 by at least one of the rail vehicles 10 is restricted. For this purpose, the fleet controller 50 sends a suitable signal, in particular an upper consumption limit, having a value different from 100%, for example, to this rail vehicle 10. Preferably, an individual upper consumption limit is transmitted to each rail vehicle 10, if its power consumption is supposed to be restricted.

The invention claimed is:

1. A rail vehicle configured for extracting electrical energy from a power supply external to the rail vehicle, comprising:
   at least one electrical energy storage unit,
      wherein the rail vehicle is configured to travel in a first operating mode using energy extracted from the power supply and without energy from the at least one energy storage unit, and, in a second operating mode using, at least in part, energy from the at least one energy storage unit and/or at a reduced traction power in comparison to the first operating mode,
      wherein the rail vehicle comprises a controller configured for activating the first operating mode or the second operating mode as a function of an upper consumption limit which defines a permissible upper limit of power that is extractable from the power supply when energy consumption from the power supply is possible, and
      wherein the upper consumption limit is variably established in order to prevent power peaks in the power supply.

2. The rail vehicle according to claim 1,
   wherein the controller is furthermore configured for activating the first or the second operating mode as a function of a power demand variable of the rail vehicle.

3. The rail vehicle according to claim 2,
wherein the second operating mode is activated, at the latest, when the power demand variable is greater than the upper consumption limit.

4. The rail vehicle according to claim 1,
wherein the upper consumption limit is established based on at least one of the following:
a target set by a driver;
a target set by a controller external to the vehicle; and
a target set by a controller internal to the vehicle.

5. The rail vehicle according to claim 1,
wherein the upper consumption limit is determined based on a measurement variable that relates to a property of the power supply external to the vehicle.

6. The rail vehicle according to claim 5,
wherein the measurement variable is a voltage variable of the power supply or a phase shift variable of the power supply, and wherein the second operating mode is activated if the voltage variable or the phase shift variable fulfills an activation criterion.

7. The rail vehicle according to claim 1,
wherein the second operating mode is activated if the momentary power of the power supply is greater than a permissible threshold value.

8. A method for operation of a rail vehicle configured for extracting electrical energy from a power supply external to the rail vehicle and having at least one electrical energy storage unit,
the method comprising:
activating a first operating mode or a second operating mode as a function of an upper consumption limit which defines a permissible upper limit of power that is extractable from the power supply when energy consumption from the power supply is possible, wherein the upper consumption limit is established in variable manner so as to prevent power peaks in the power supply;
wherein, in the first operating mode, the rail vehicle is configured to travel by means of energy extracted from the power supply external to the vehicle, and without energy from the energy storage unit, and, in the second operating mode, the rail vehicle is configured to travel at least in part by means of energy from the energy storage unit and/or at reduced traction power in comparison to the first operating mode.

9. An arrangement comprising:
at least two rail vehicles configured for extracting electrical energy from a power supply external to the vehicle for travel movement, wherein
a fleet controller is set up for establishing an upper consumption limit which defines a permissible upper limit of power that is extractable by at least one of the rail vehicles from the power supply when energy consumption from the power supply is possible in accordance with power demand variables that are received by each one of the rail vehicles, and in order to prevent power peaks in the power supply.

10. The arrangement according to claim 9,
wherein at least one of the rail vehicles is configured according to claim 1.

11. A method for operation of a rail vehicle fleet having a first rail vehicle and at least one further rail vehicle, which are each configured for extracting electrical energy from a power supply external to the vehicle for travel movement,
the method comprising:
transmitting a power demand variable of each of the rail vehicles to a fleet controller; and
establishing an upper consumption limit for power that is extractable from the power supply for at least one of the rail vehicles when energy consumption from the power supply is possible, in accordance with the power demand variables received, in order to prevent power peaks in the power supply.

* * * * *